(12) United States Patent  
Hori et al.

(10) Patent No.: US 7,502,199 B2
(45) Date of Patent: Mar. 10, 2009

(54) MEDIA CARTRIDGE AUTOLOADER

(75) Inventors: Kenichi Hori, Tama (JP); Paddy Eliot Collins, Colorado Springs, CO (US)

(73) Assignees: Mitsumi Electric Co., Ltd., Tokyo (JP); Quantum Corporation, San Jose, CA (US)

( * ) Notice: Subject to any disclaimer, the term of this patent is extended or adjusted under 35 U.S.C. 154(b) by 322 days.

(21) Appl. No.: 11/280,871

(22) Filed: Nov. 16, 2005

(65) Prior Publication Data

US 2007/0058284 A1 Mar. 15, 2007

(30) Foreign Application Priority Data

Sep. 15, 2005 (JP) ............................. 2005-269196

(51) Int. Cl.
*G11B 15/68* (2006.01)
(52) U.S. Cl. ....................................................... 360/92
(58) Field of Classification Search .................. None
See application file for complete search history.

(56) References Cited

U.S. PATENT DOCUMENTS 6,606,218 B2 * 8/2003 Collins et al. .............. 360/92.1
6,816,331 B2 * 11/2004 Porter et al. ................ 360/69
2002/0057519 A1 * 5/2002 Porter et al. ................ 360/92
2002/0057520 A1 * 5/2002 Collins et al. .............. 360/92

FOREIGN PATENT DOCUMENTS

JP 2003 45102 2/2003

* cited by examiner

*Primary Examiner*—Mark Blouin
(74) *Attorney, Agent, or Firm*—Ladas & Parry LLP

(57) ABSTRACT

A media cartridge autoloader is disclosed which includes a main module including a media cartridge picker that pulls in a media cartridge via a mail slot and ejects the media cartridge via the mail slot. A media drive selectively receives the media cartridge. First and second media cartridge transport magazines transportably store the media cartridge. The main module further includes a stopper mechanism that inhibits the media cartridge from being fully reinserted when inserting the media cartridge is attempted in a state where the media cartridge has been ejected so as to at least partially protrude outside of the mail slot. The stopper mechanism contacts a lower part of a rear side of the media cartridge to stop the media cartridge in a state where a front side of the media cartridge is at least partially ejected through the mail slot.

13 Claims, 22 Drawing Sheets

T2 < T1

MEDIA CARTRIDGE AUTOLOADER

BACKGROUND OF THE INVENTION

1. Field of the Invention

The present invention generally relates to a media cartridge autoloader.

2. Description of the Related Art

A typical media cartridge autoloader includes a media cartridge picker in the center, a mail slot at the front side, a read/write media drive at the rear side, and media cartridge transport magazines disposed one at each lateral side.

The media cartridge picker is configured to transport a media cartridge among the mail slot, the media drive, and the media cartridge transport magazines.

The media cartridge autoloader is ejected according to an eject instruction so that a part of the media cartridge protrudes outside of the mail slot. After that, an operator grabs the media cartridge and pulls it out.

After the operator grabs the media cartridge and pulls it out, a door is closed and locked so that the operator cannot reinsert the media cartridge unnecessarily. The media cartridge autoloader can include a stopper mechanism that inhibits the media cartridge from being reinserted.

A plurality of different types of media cartridges for use in the above described media cartridge autoloader are now available commercially. Accordingly, for a maker manufacturing the media cartridge autoloader, it is desirable to produce a first media cartridge autoloader corresponding to the first media cartridge, and a second media cartridge autoloader corresponding to the second media cartridge.

In this case, as for the stopper mechanism described above, it is important to attempt to share the parts as much as possible to keep the manufacturing cost of the media cartridge autoloader low.

SUMMARY OF THE INVENTION

The present invention is directed toward a media cartridge autoloader including a main module having a media cartridge picker that retrieves a media cartridge and transports the media cartridge, a media drive, and first and second media cartridge transport magazines positioned near the cartridge picker and each configured to transportably store the media cartridge. The main module further comprises a stopper mechanism that inhibits the media cartridge from being inserted when the operator inadvertently pushes in the media cartridge after the media cartridge is ejected and protrudes outside of a mail slot. In one embodiment, the stopper mechanism can stop a lower part of a rear side of the media cartridge where a front side thereof has been ejected through the mail slot.

Accordingly, the stopper mechanism can be normally operated for a different size media cartridge that may be thinner than the media cartridge as above described. Therefore, the stopper mechanism design can be shared in manufacturing a main module for each kind of the media cartridges. Thus, the parts of the media cartridge autoloaders can be commonly made, so the production cost of the media cartridge autoloaders is lowered.

DESCRIPTION OF THE PREFERRED EMBODIMENTS

An exemplary embodiment of the present invention is described hereinafter with reference to the accompanying drawings.

First Embodiment

The description of a first embodiment includes the following:

1. Configuration and Operations Overview of Tape Cartridge Autoloader 100

2. Configuration of Main Module 110

3. Configuration and Operations of Tape Cartridge Picker 102

4. Configuration of Mail Slot Module 340

5. Operations of Stopper Mechanism 500

6. Configuration of Tape Cartridge Autoloader 100A for the Second Tape Cartridge 7. Configuration and Operations of Mail Slot Module 340A

1 [Configuration and Operations Overview of Tape Cartridge Autoloader 100]

Figure 1:
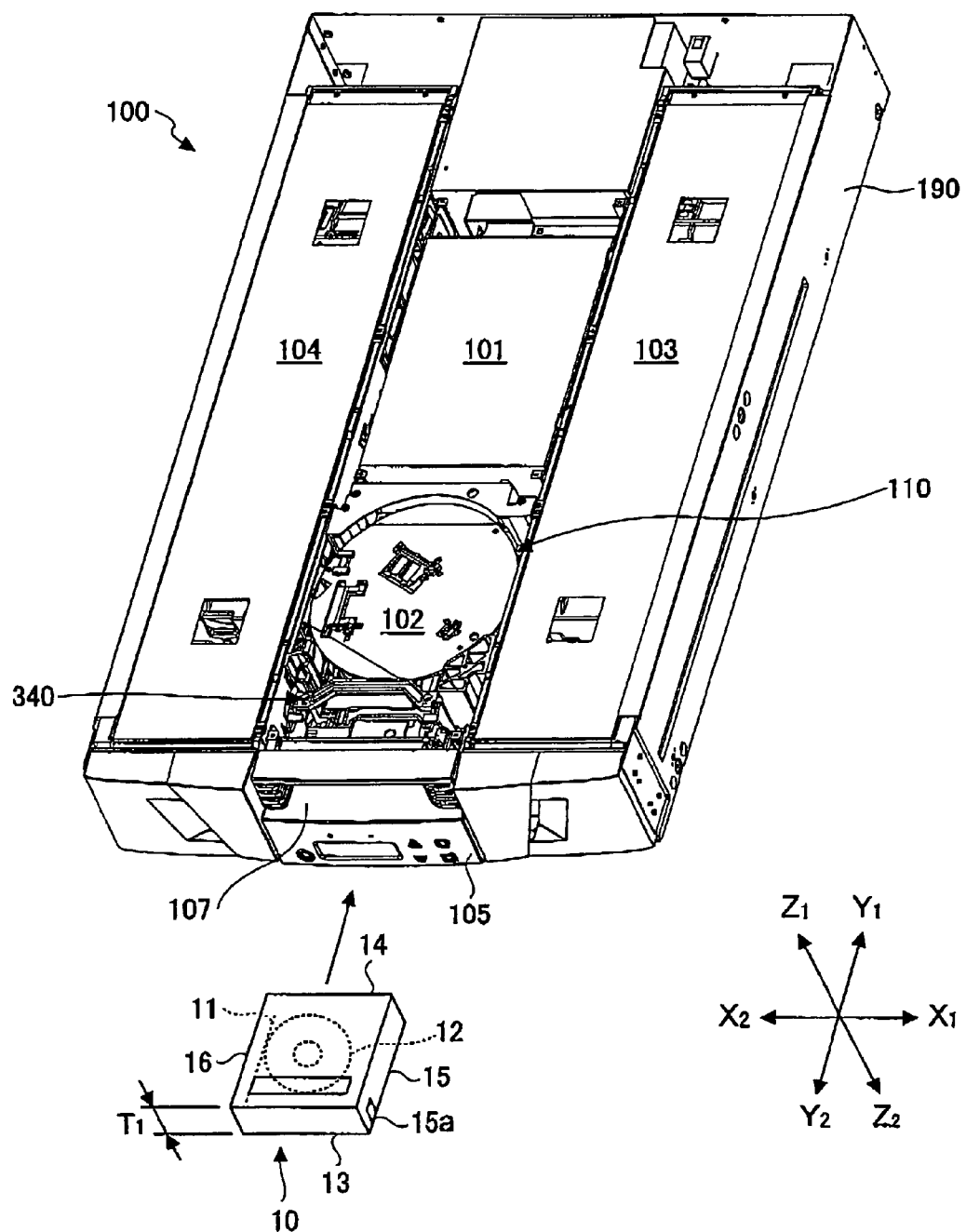
FIG. 1 is a perspective view illustrating a media cartridge autoloader with an upper cover thereof removed according to a first embodiment of the present invention.

FIG. 1 is a perspective view illustrating a media cartridge autoloader 100 with an upper cover thereof removed according to the first embodiment of the present invention. In the embodiments illustrated in the figures, the media cartridge autoloader is used with one or more tape cartridges, and is therefore referred to as a tape cartridge autoloader. It is recognized, however, that although the following description and the figures provided herein pertain particularly to an autoloader used for tape cartridges, any other suitable type of media cartridge can equally be used with the present invention, such as an optical disk cartridge, as one non-exclusive example. The embodiments disclosed herein are not intended to limit the scope of the present invention in any manner to use with tape cartridges or any other particular type of media. In other words, it is understood that the term "tape" as used herein can equally be substituted for the term "media".

Figure 2:
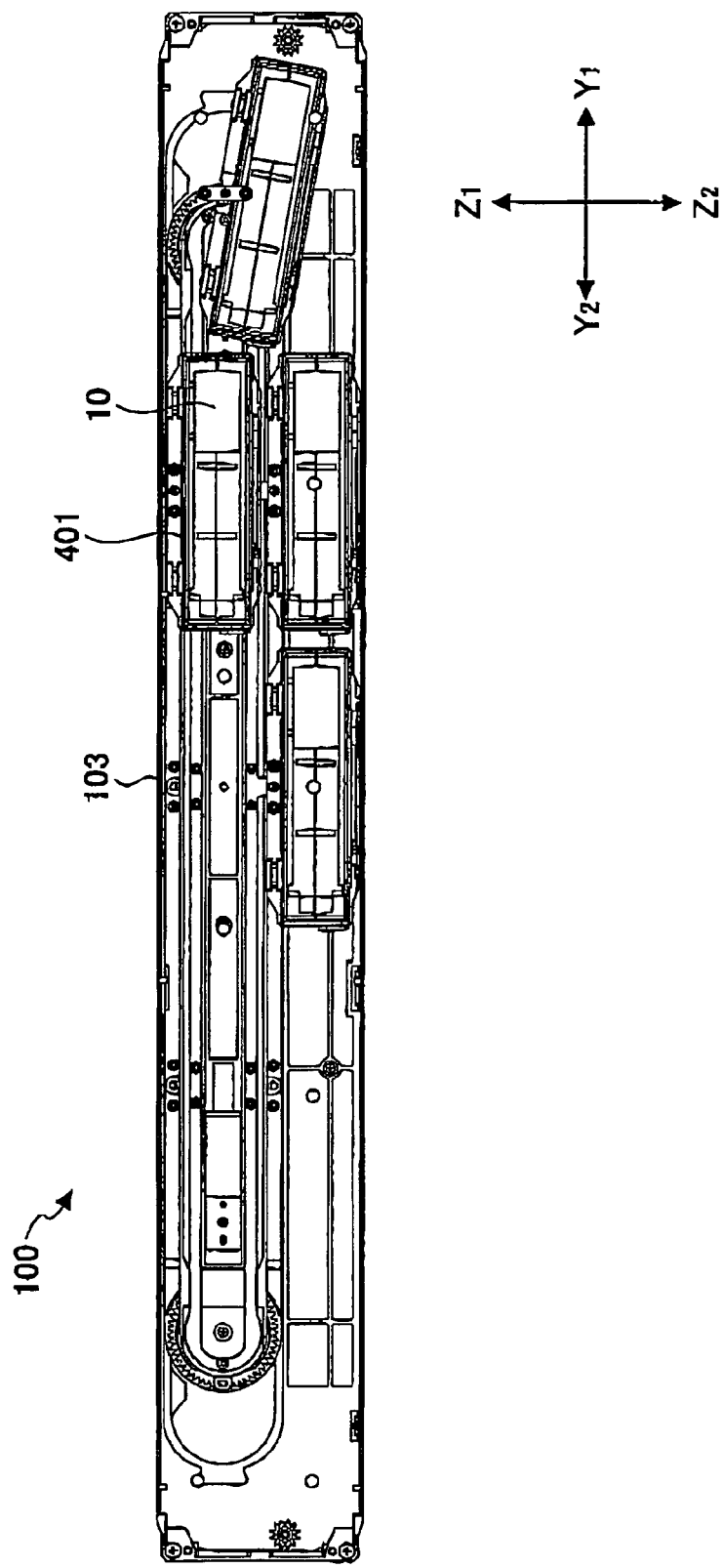
FIG. 2 is a side view illustrating the media cartridge autoloader of FIG. 1 with a side cover thereof removed.

FIG. 2 is a side view illustrating the tape cartridge autoloader 100 with a side cover thereof removed. Throughout the drawings, the width direction is indicated by a line X1-X2, the depth direction is indicated by a line Y1-Y2, and the height direction is indicated by a line Z1-Z2.

In one embodiment, the tape cartridge autoloader 100 generally comprises a metal frame 190, a control panel 105 and a mail slot 107 both on a front panel, a main module 110 including a tape cartridge picker 102 at a position opposing the mail slot 107, a tape drive 101 disposed at the Y1 side of the main module 110, and first and second tape cartridge transport magazines 103 and 104 disposed one at the X1 side and the other at the X2 side of the main module 110. The tape cartridge transport magazines 103 and 104 can be inserted toward the Y1 side from the front panel side and removably attached on opposing sides of the frame 190. It is understood that either tape cartridge transport magazine 103, 104 can be the first tape cartridge transport magazine or the second tape cartridge transport magazine. The tape cartridge autoloader 100 can be mounted in a rack by, for example, fixing four corners of the frame 190 to poles of the rack.

In certain embodiments, the tape cartridge autoloader 100 is designed such that operations of the tape cartridge picker 102, operations of the tape cartridge transport magazines 103 and 104, unlocking the door of the mail slot 107 and unlocking the tape cartridge transport magazines 103 and 104 do not overlap in terms of time.

The first tape cartridge 10 is used in the tape cartridge autoloader 100. Referring to FIG. 1, the tape cartridge 10 includes a magnetic tape 11 wound on a single reel 12 therein such that the magnetic tape 11 is pulled out from a rear face of the tape cartridge 10. The tape cartridge 10 includes a front face 13, a rear face 14, side faces 15 and 16, and a notch 15a formed on the side face 15 which a cartridge pin (described below) engages.

The tape cartridge transport magazines 103 and 104 are each configured to store plural tape cartridges 10 orienting the front faces 13 to face the tape cartridge picker 102. The tape cartridge transport magazines 103 and 104 are also configured to transport the tape cartridges 10 along a racetrack path elongated in the Y1-Y2 direction as shown in FIG. 2.

The tape drive 101 is operable to read and/or write data from or to the magnetic tape 11 pulled out from the loaded tape cartridge 10. The tape drive 101 includes a tape ejecting mechanism (not shown). Plural types of tape drives with different heights are available so that one drive is selected from them and attached to the tape cartridge autoloader 100. For this operation, the tape cartridge picker 102 is provided with a turntable lifting mechanism 150 (described below).

Figure 3:
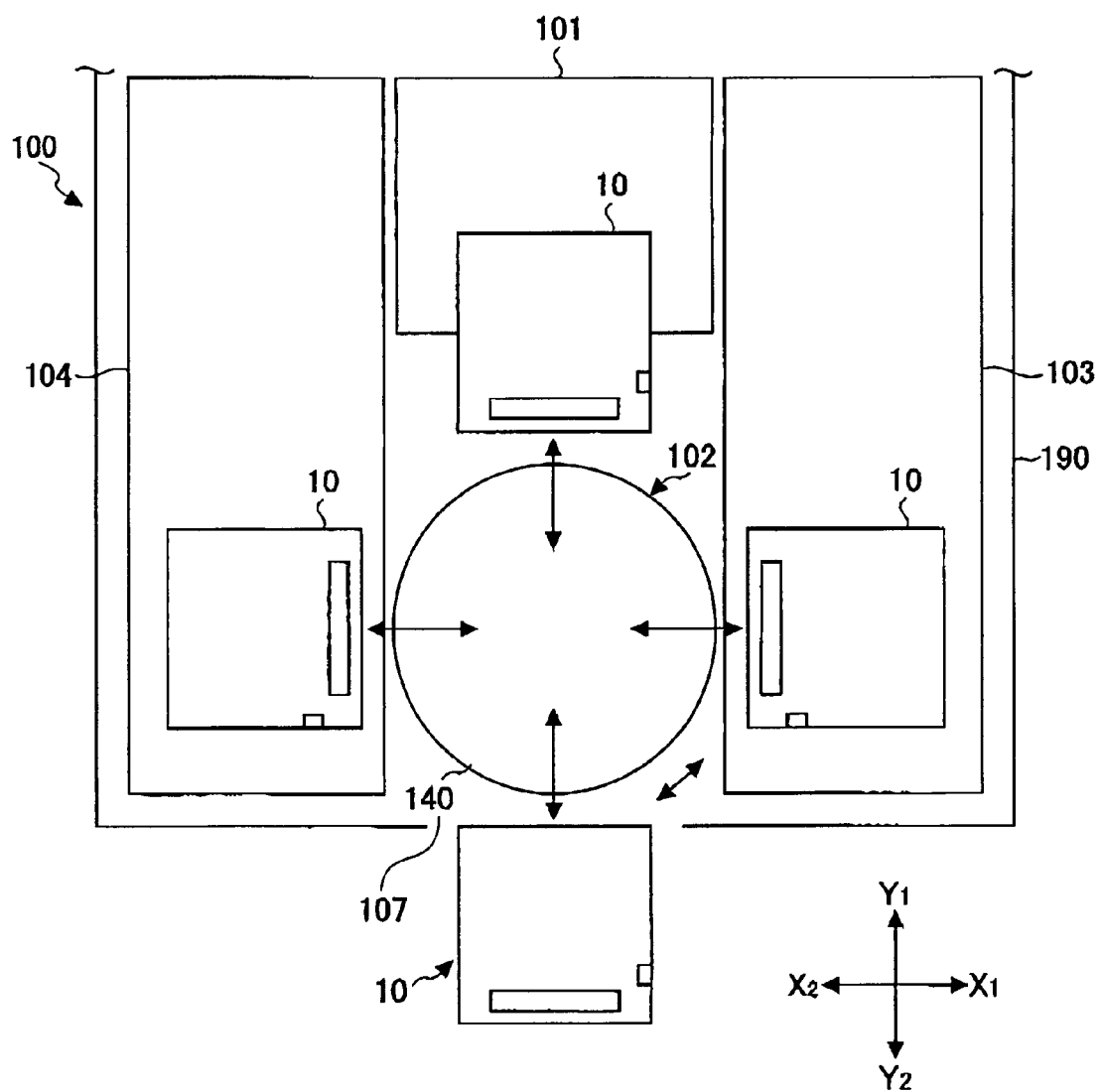
FIG. 3 is a schematic illustration showing operations of a media cartridge picker.

Referring to FIG. 3, the tape cartridge picker 102 is configured to transport the tape cartridge 10 onto or off of a turntable 140 for operations such as loading the tape cartridge 10 inserted through the mail slot 107 into the tape drive 101, retrieving the tape cartridge 10 from one of the tape cartridge transport magazines 103 and 104 to load the tape cartridge 10 onto the tape drive 101, retrieving the tape cartridge from the tape drive 101 to return the tape cartridge 10 to one of the tape cartridge transport magazines 103 and 104, and ejecting the tape cartridge 10 through the mail slot 107. The tape cartridge picker 102 is also configured to rotate the turntable 140 by a predetermined rotational increment, such as approximately in increments of 90 degrees, for example, although the predetermined rotational increment can be varied to suit the design requirements of the autoloader. The cartridge picker 102 can also lift/lower the turntable 140, as necessary. When the turntable 140 is rotated, the orientation of the tape cartridge 10 is changed.

When an eject instruction is sent, the tape cartridge 10 is ejected by a tape cartridge transport mechanism 170 (See FIG. 12) so that the front side 13 of the tape cartridge 10 protrudes outside of the mail slot 107. After that, the operator grabs the tape cartridge to pull it out.

Figure 4:
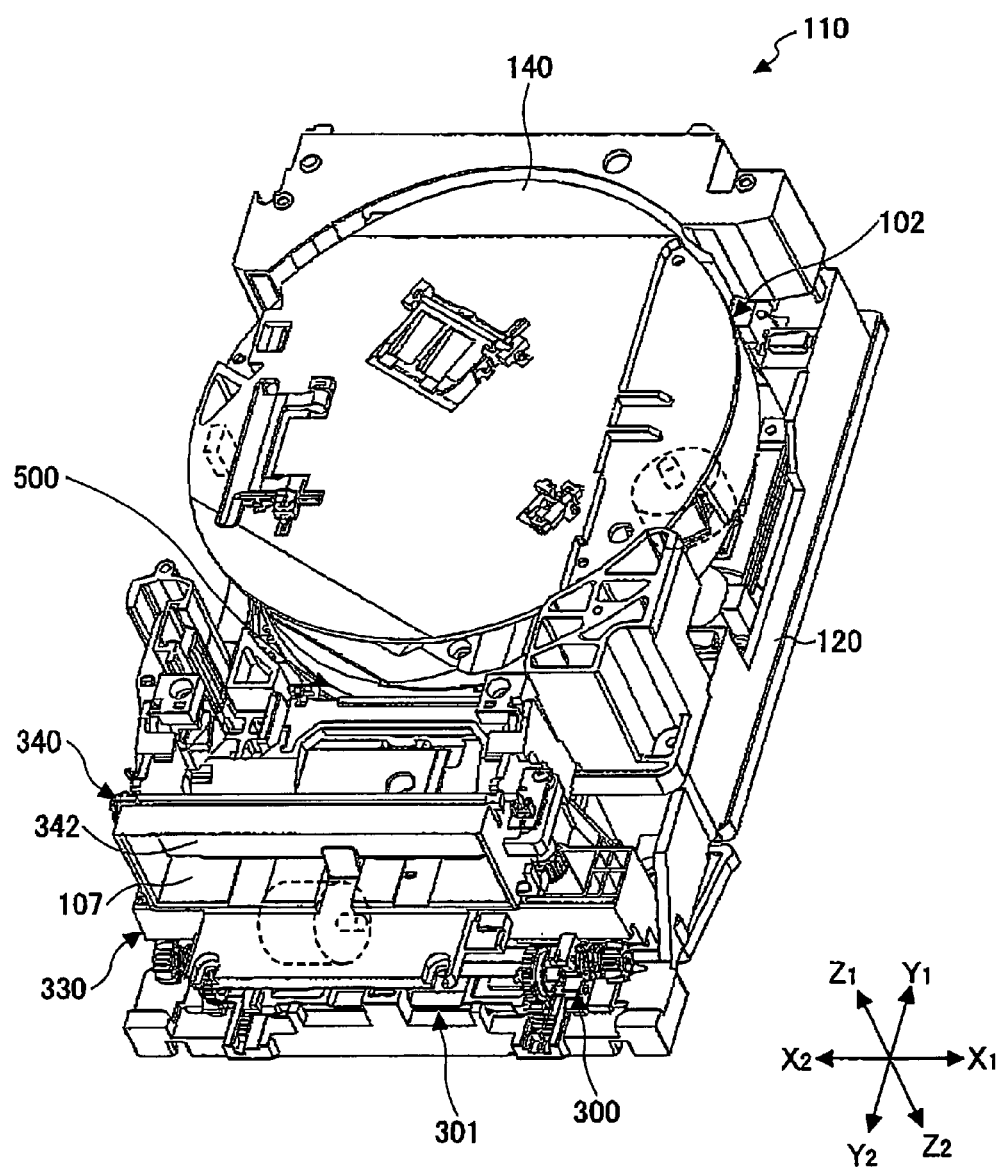
FIG. 4 is a perspective view illustrating a main module.
Figure 5:
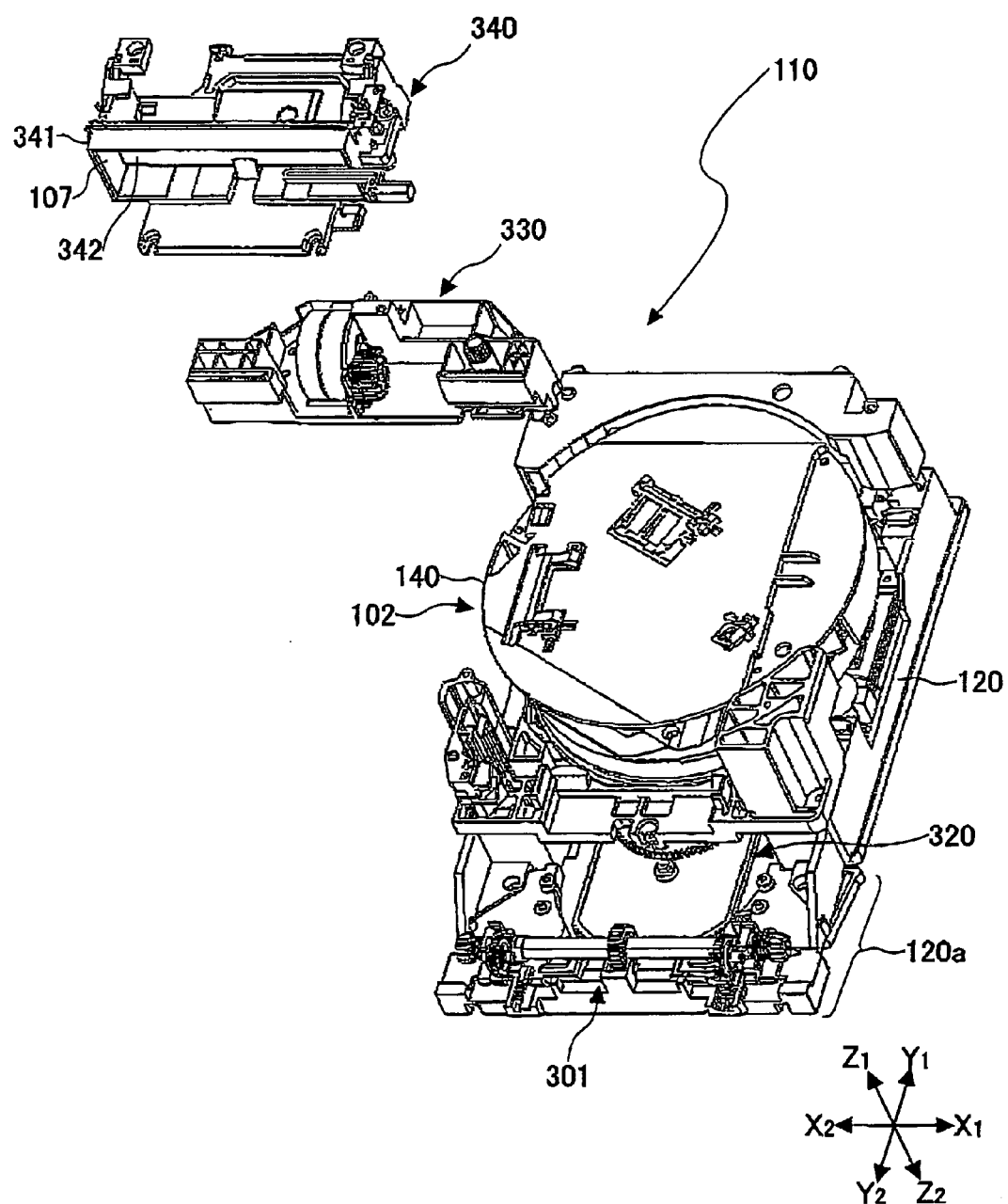
FIG. 5 is an exploded view illustrating the main module.
Figure 6:
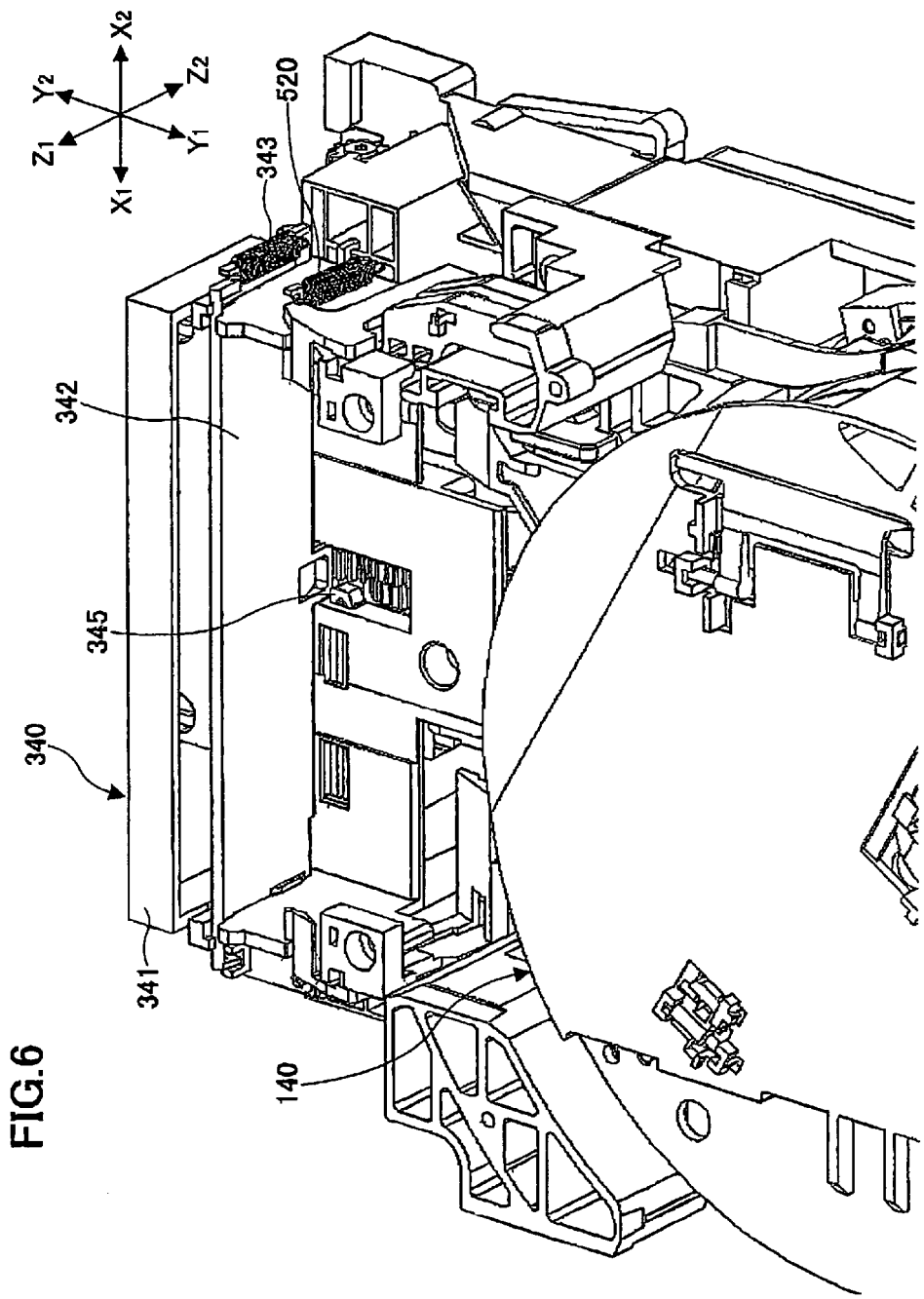
FIG. 6 is a perspective view of the main module, viewed from a Y1 side.

2 [Configuration of Main Module 110] (FIGS. 4-6)

FIG. 4 is a perspective view of the main module 110. FIG. 5 is an exploded view of the main module 110. FIG. 6 is a perspective view of the main module 110, viewed from the Y1 side.

In this embodiment, the main module 110 includes a base 120. The main module 110 also includes the tape cartridge picker 102, a tape cartridge transport magazine drive motor module 330, a mail slot module 340 and a rotation transmission path forming device 300. The tape cartridge picker 102 can occupy a large part of the base 120. The base 120 includes an extension 120a extending at the Y2 side of the tape cartridge picker 102. A drive shaft unit 301 and the tape cartridge transport magazine drive motor module 330 are disposed on the extension 120a. For example, a mail slot module 340 can be mounted on the upper side of the magazine drive motor module 330. The rotation transmission path forming device 300 comprises the drive shaft unit 301 and the magazine drive motor module 330 as described below.

3 [Configuration and Operations of Tape Cartridge Picker 102] (FIGS. 7-12)

Figure 7:
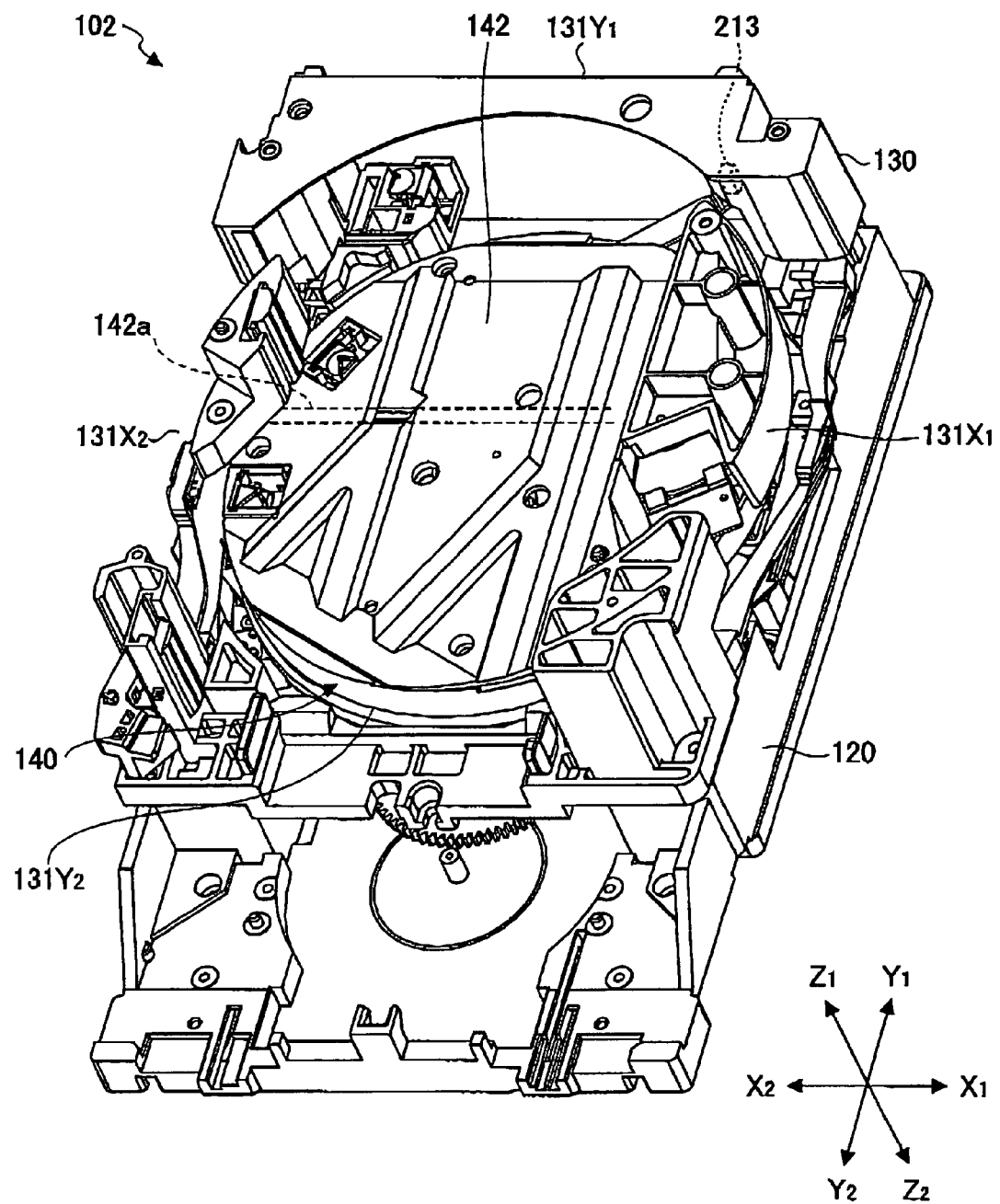
FIG. 7 is a perspective view illustrating the media cartridge picker.
Figure 8:
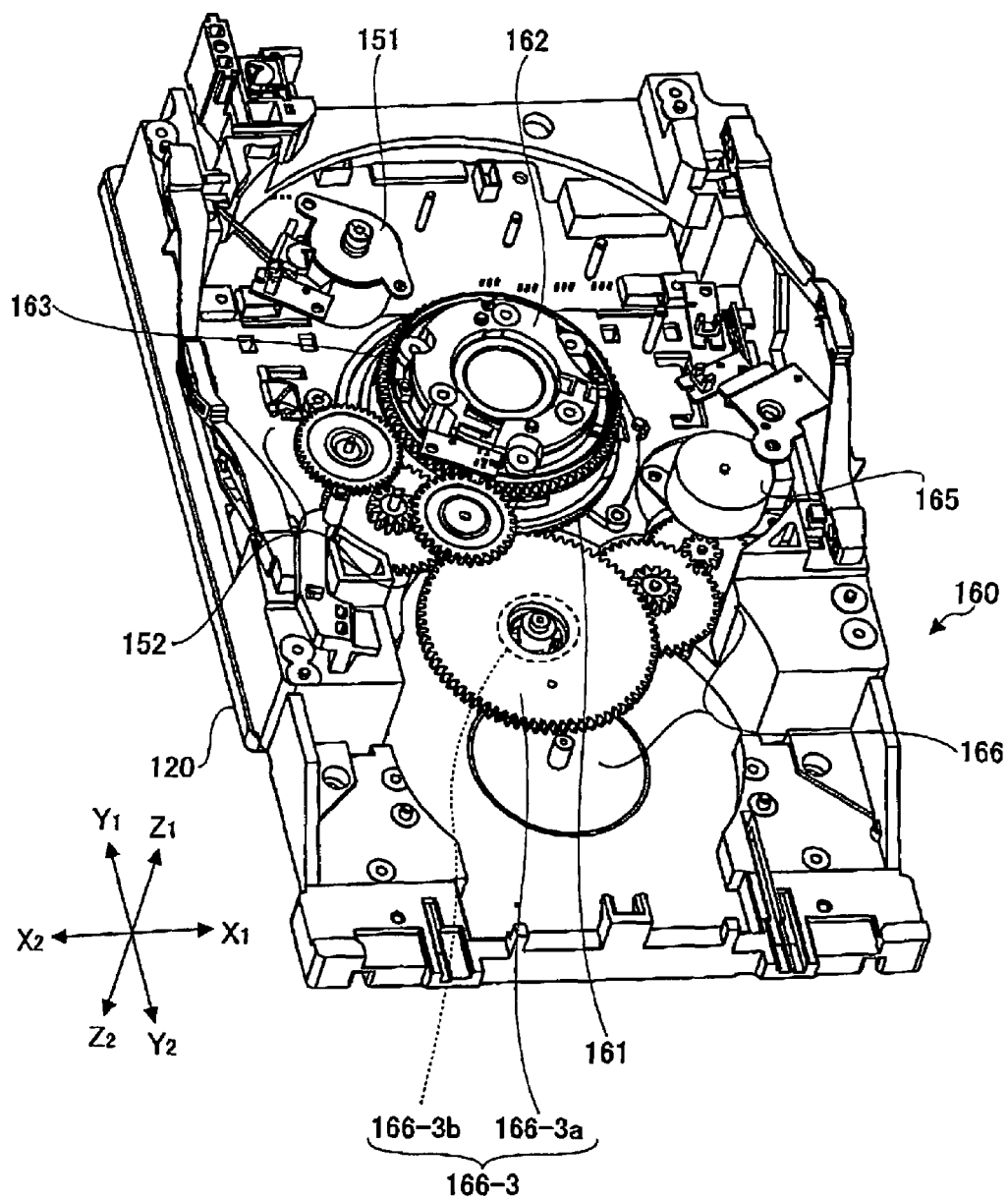
FIG. 8 is a perspective view illustrating the media cartridge picker with a pillar and a turntable removed.
Figure 9:
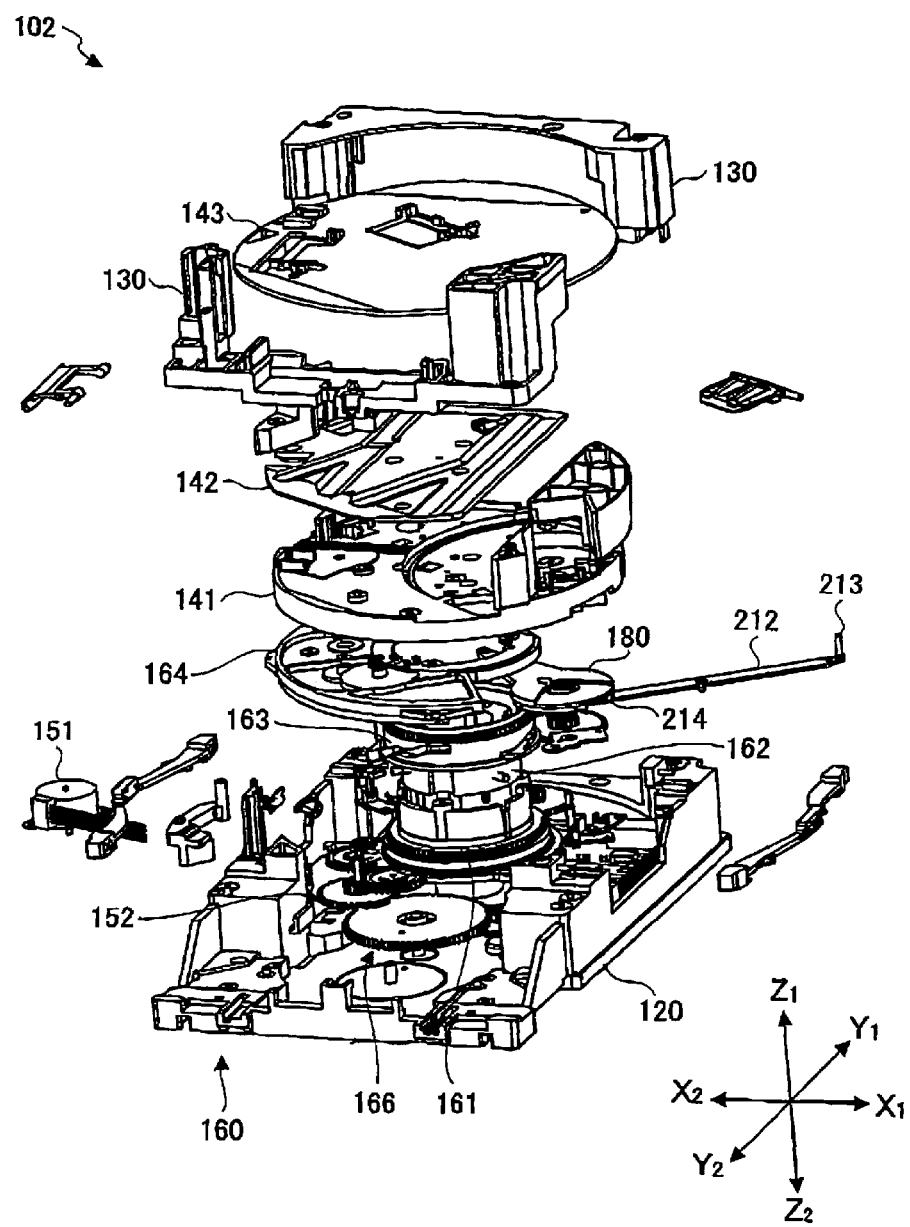
FIG. 9 is an exploded perspective view illustrating the media cartridge picker.
Figure 10:
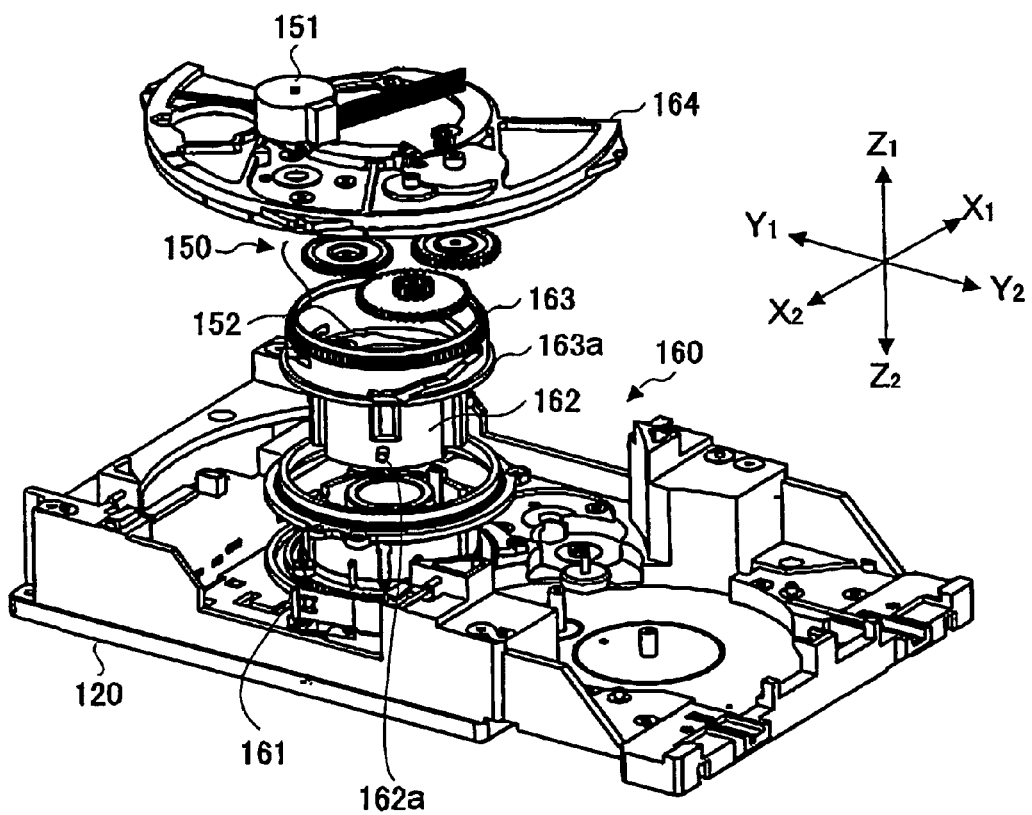
FIG. 10 is an exploded perspective view illustrating a turntable lifting mechanism in FIG. 9 in detail.

FIG. 7 illustrates the tape cartridge picker 102 with an upper plate 143 of the turntable 140 removed. FIG. 8 illustrates the tape cartridge picker 102 with a pillar 130 and the turntable 140 removed. FIG. 9 is an exploded perspective view illustrating the tape cartridge picker 102. FIG. 10 illustrates the turntable lifting mechanism 150 in detail.

The tape cartridge picker 102 includes the pillar 130 mounted on the base 120, the turntable 140 (FIG. 11) configured to support the tape cartridge 10, the turntable lifting mechanism 150 (FIG. 10) configured to slightly lift and lower the turntable 140 for height position adjustment, and a turntable rotating mechanism 160 configured to rotate the turntable 140 at a predetermined rotational increment, such as approximately every 90 degrees, for example. The tape cartridge picker 102 has ports 131X1, 131X2, 131Y1, and 131Y2 on four sides thereof (see FIG. 7).

A rotating ring gear 161, a cylindrical stand 162, a lifting ring gear 163, and a sub base 164 are disposed on the base 120. The rotating ring gear 161 is rotatably attached on the base 120. The cylindrical stand 162 is arranged at the inner side of the rotating ring gear 161 and the lifting ring gear 163 so as to be rotated along with the rotating ring gear 161 and be lifted independently from the rotating ring gear 161. The lifting ring gear 163 is arranged at the upper side of the rotating ring gear 161 so as to be rotated independently from the rotating ring gear 161. A boss 162a (FIG. 10) of the cylindrical stand 162 is configured to engage a diagonal groove 163a of the lifting ring gear 163. The cylindrical stand 162 is rotated by rotation of the rotating ring gear 161, and lifted/lowered by rotation of the lifting ring gear 163. The sub base 164 is a semi-circular plate fixed on the upper side of the rotating ring gear 161.

Figure 11:
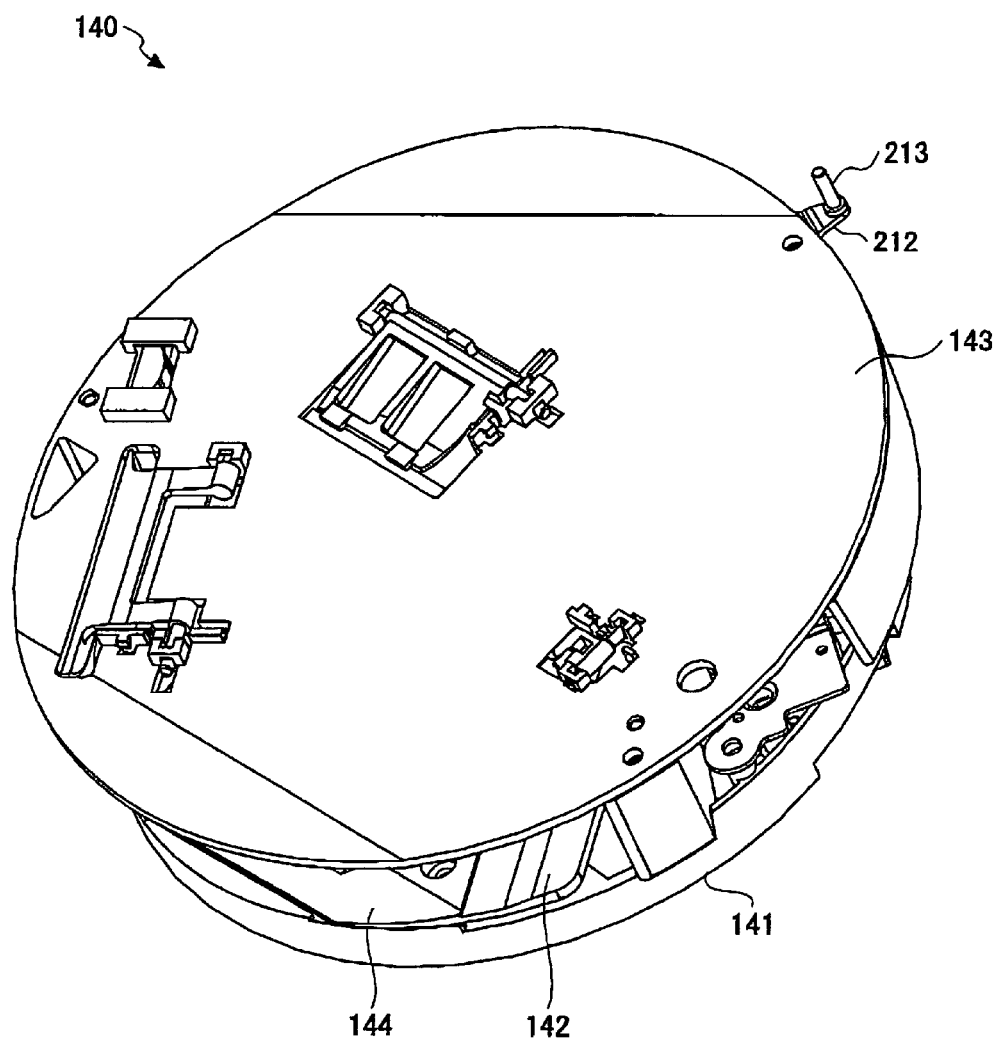
FIG. 11 is a perspective view illustrating the turntable.

Referring to FIG. 11, the turntable 140 includes a base plate 141, a floor plate 142, the upper plate 143, and a clearance 144 between the floor plate 142 and the upper plate 143 to receive the tape cartridge 10. The base plate 141 is screwed onto the cylindrical stand 162 (FIG. 10).

Referring to FIG. 10, the lifting mechanism 150 includes a stepping motor 151, a gear train 152, and the lifting ring gear 163. Both the stepping motor 151 and the gear train 152 are provided on the sub base 164.

As shown in FIG. 8, the turntable rotating mechanism 160 includes a stepping motor 165, a reduction gear train 166, and the rotating ring gear 161, all of which are provided on the base 120 (FIG. 8-9). A two-stage gear 166-3, which is the last stage gear of the reduction gear train 166, comprises a large-diameter gear section 166-3a and a small-diameter gear section 166-3b.

The lifting mechanism 150 has a function of initializing the turntable 140 by lifting/lowering the turntable 140 to a home position thereof in the Z directions. The turntable rotating mechanism 160 has a function of initializing the turntable 140 by rotating the turntable 140 to the home position in the rotation direction. The home position of the turntable 140 is a position where a y-axis (described later) becomes parallel to the Y-axis. The lifting mechanism initialization operation and the turntable rotating mechanism initialization operation apply a method of moving an object to an operation end position defined as a reference position, and then moving the object back by a predetermined distance. The same method is applied to operations for initializing a tape cartridge transport mechanism 170 (described below).

Figure 12:
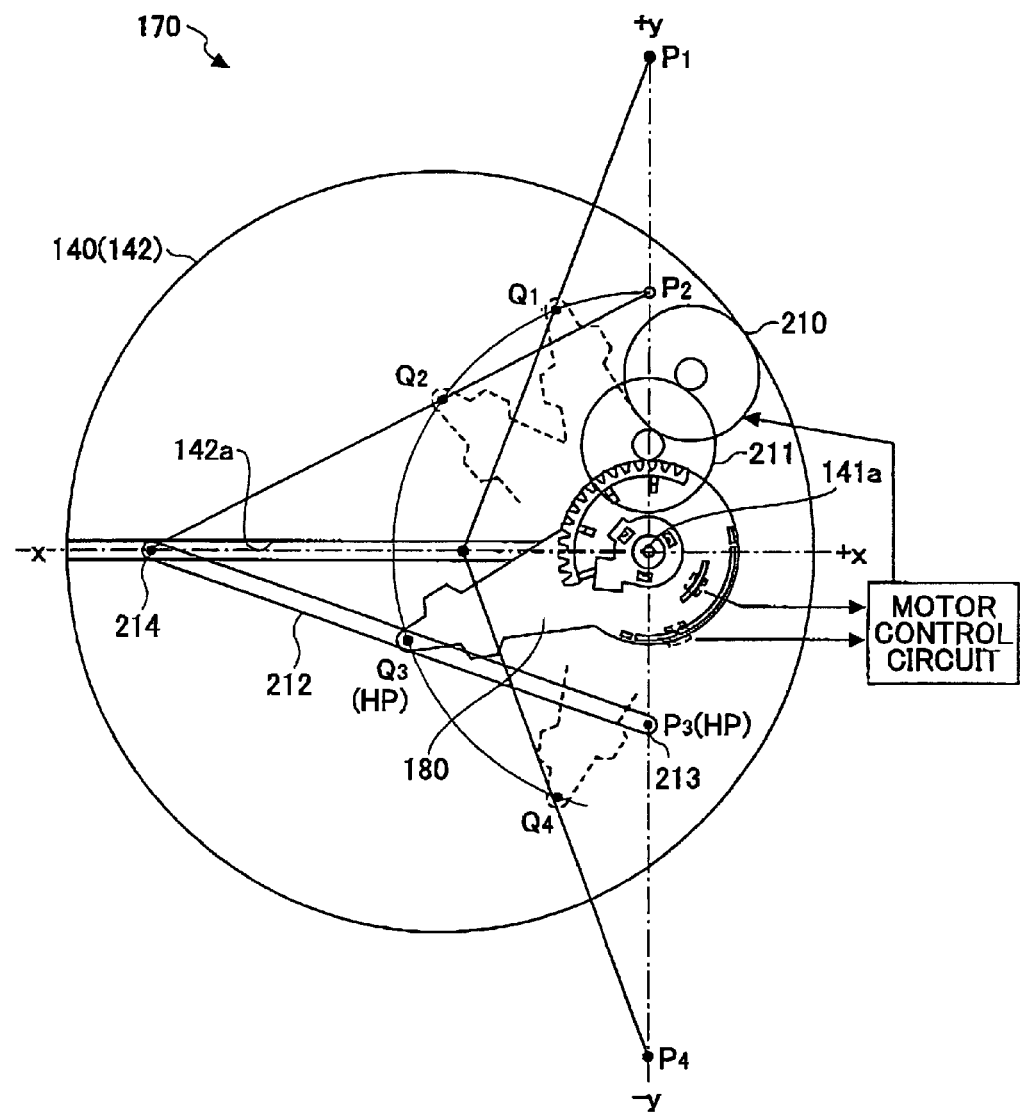
FIG. 12 is a schematic illustration showing a media cartridge transport mechanism.

Referring to FIG. 12, for the sake of explanation, the description below is applied. The turntable 140 has coordinates applied wherein the position of a pin 141a (to be described below) is defined as the origin, a guide groove 142a (to be described below) is defined as an x-axis, and an axis passing through the origin and being orthogonal to the x-axis is defined as a y-axis.

The tape cartridge transport mechanism 170 and a stepping motor 210 (described later), both shown in FIG. 12, are provided on the base plate 141.

The tape cartridge transport mechanism 170 has a function of moving the tape cartridge 10 between a position on the turntable 140, i.e., a position inside the clearance 144, and a position outside the tape cartridge picker 102. In one embodiment, the tape cartridge transport mechanism can move the tape cartridge 10 in a substantially linear direction. In alternative embodiments, the movement of the tape cartridge can be non-linear, or can combine both linear and non-linear movements. The tape cartridge transport mechanism 170 includes a rotary arm 180 rotatably attached to the pin 141a formed on the base plate 141, the stepping motor 210 configured to reciprocally rotate the rotary arm 180 between positions Q1 and Q4 within a predetermined angular range, a reduction gear mechanism 211 configured to transmit the rotation of the motor 210 at a reduced rotation rate to the rotary arm 180, and a lever 212 with a center part rotatably connected to a tip end of the rotary arm 180. A cartridge pin 213 is vertically fixed to an end of the lever 212, while a pin 214 is fixed to the other end of the lever 212. The pin 214 engages a guide groove 142a formed on a lower face of the floor plate 142. In one embodiment, the guide groove 142a can have a substantially linear configuration. Alternatively, the guide groove can be substantially non-linear, or can combine both linear and non-linear sections.

The turntable rotating mechanism 160 rotates the turntable 140 by a predetermined rotational increment, such as approximately every 90 degrees, for example, in the clockwise direction or the counterclockwise direction with respect to the home position such that the orientation of the tape cartridge 10 is changed. In non-exclusive alternative embodiments, the turntable can be rotated greater than or less than 90 degrees in either direction. The tape cartridge transport mechanism 170 retrieves the tape cartridge 10 and transports it onto and off of the turntable 140 (see FIG. 3) while the cartridge pin 213 is engaged in the notch 15a of the tape cartridge 10 (FIG. 1).

4 [Configuration of Mail Slot Module 340]

Figure 13A:
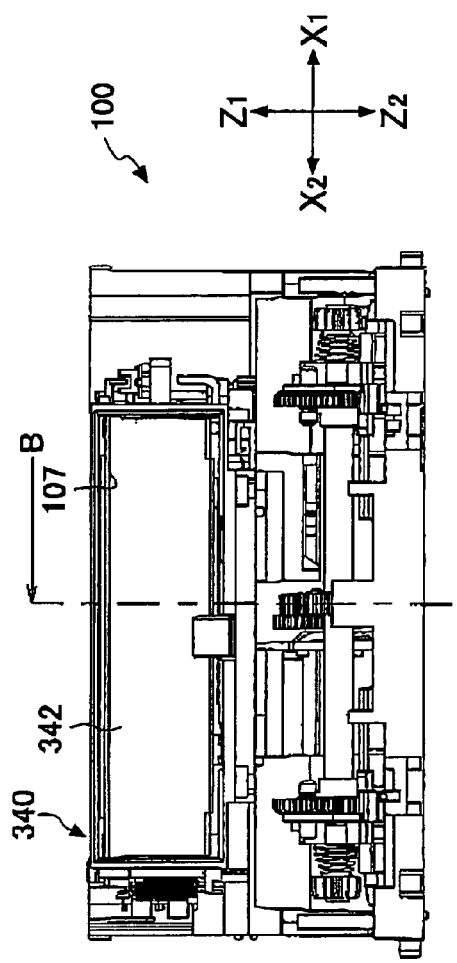
FIG. 13A is a front view illustrating a main module.
Figure 13B:
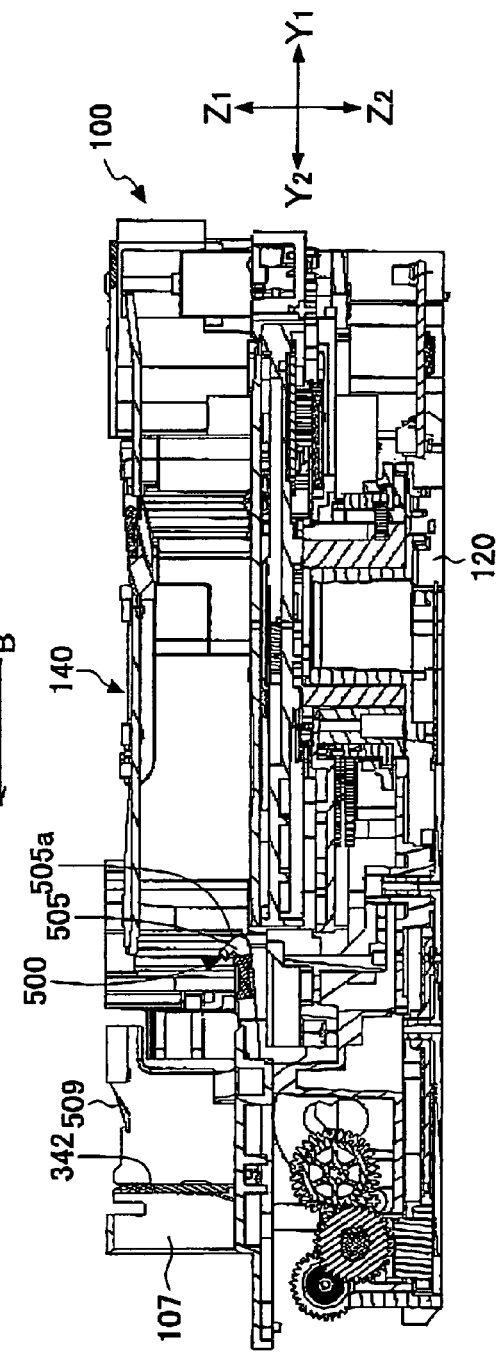
FIG. 13B is a cross-sectional view of the main module taken along plane B-B of FIG. 13A.
Figure 14:
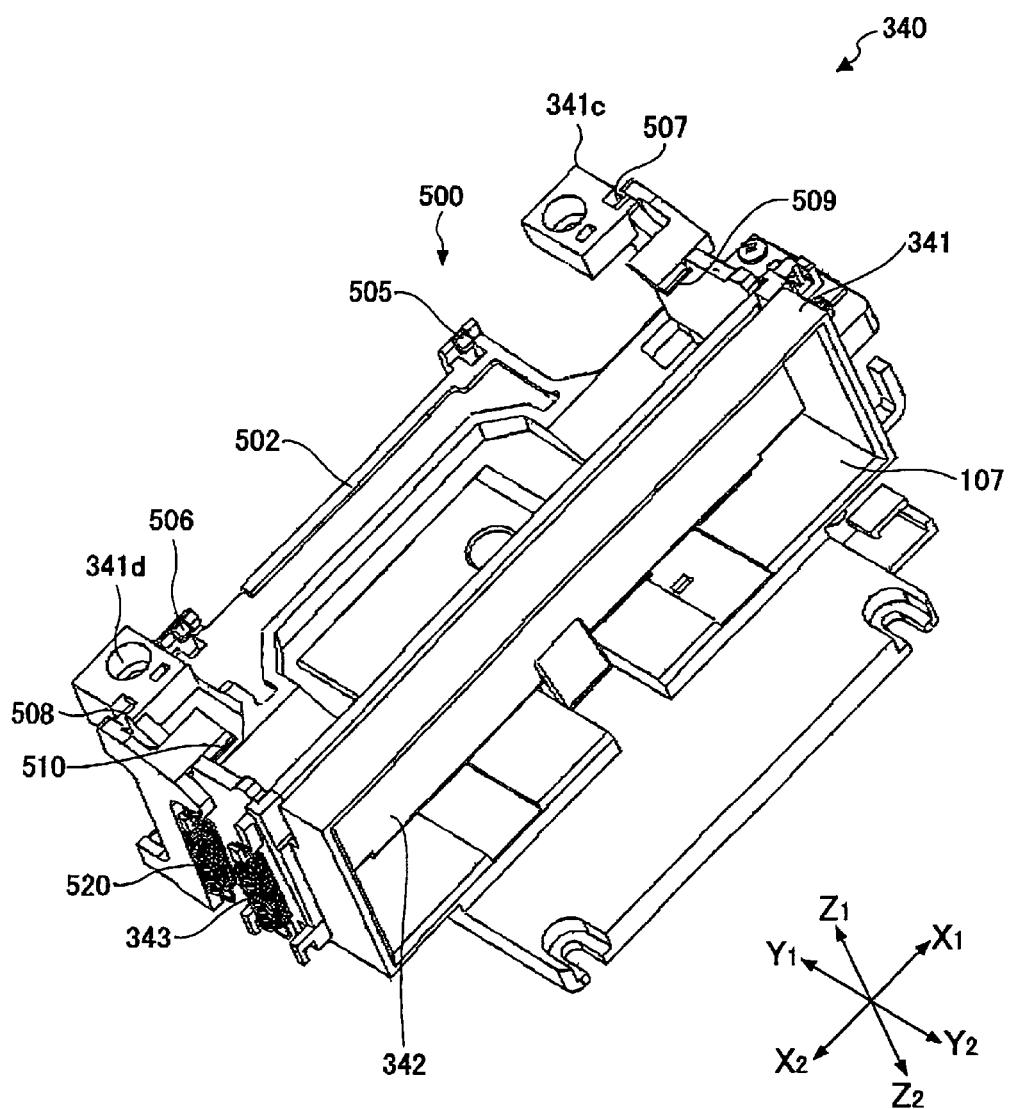
FIG. 14 is a perspective view illustrating a mail slot module.
Figure 15:
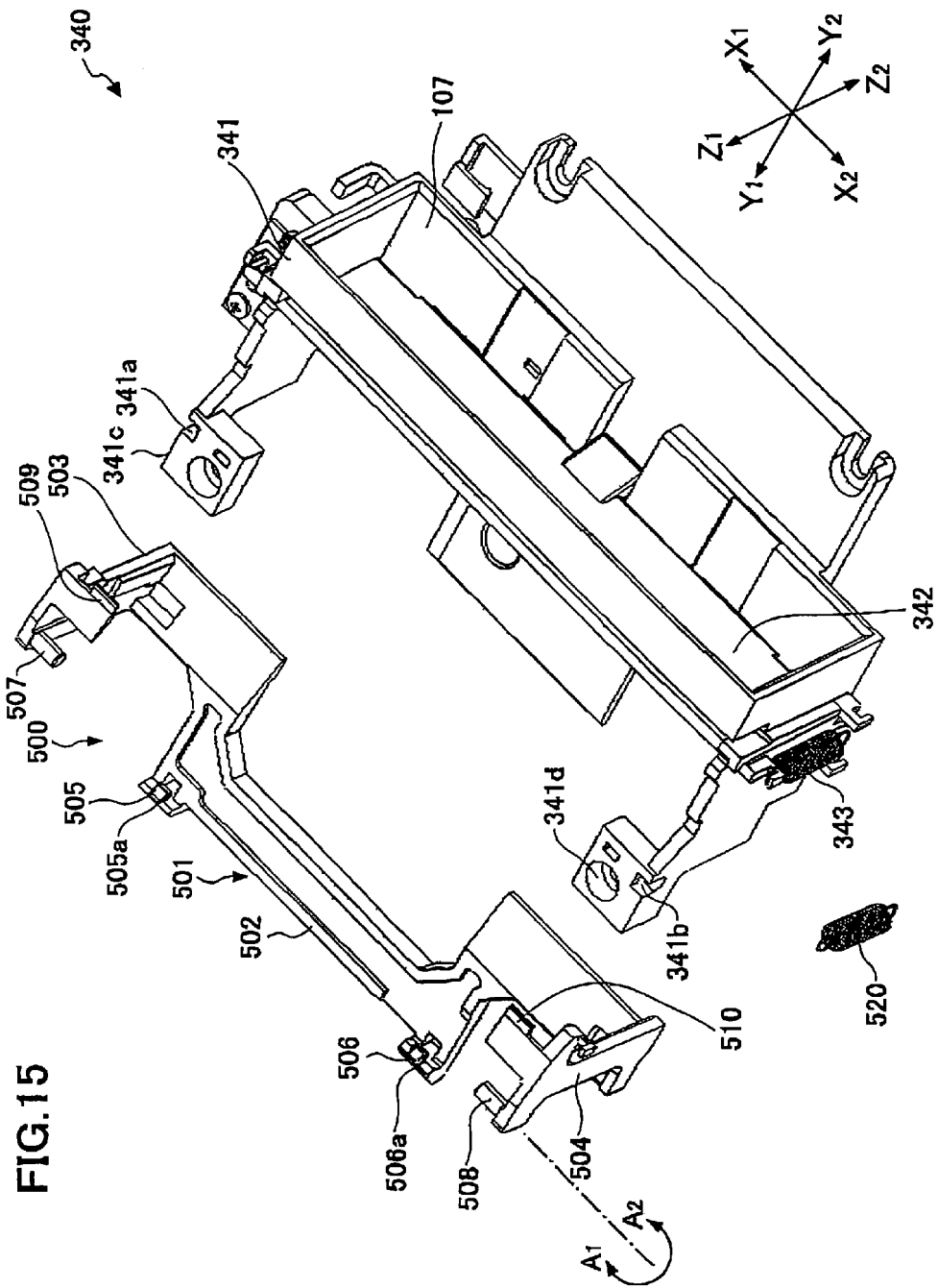
FIG. 15 is an exploded perspective view illustrating the mail slot module.

FIG. 13A is a front view illustrating the main module 110. FIG. 13B is a cross-sectional view of the main module 110. FIG. 14 is a perspective view illustrating a mail slot module 340. FIG. 15 is an exploded perspective view illustrating the mail slot module 340.

Referring to FIG. 6, the mail slot module 340 comprises a frame 341 having a mail slot 107, a door 342 closing the mail slot 107, a door locking mechanism 345 locking the door 342 in the closed state and a stopper mechanism 500.

The door 342 is configured to have a fulcrum for rotating on the Z1 side, energized in the direction where the door 342 is closed by a spring member 343 and pushed to open by the tape cartridge being inserted.

The stopper mechanism 500 has a function of inhibiting the tape cartridge 10 from being inserted when an operator inadvertently reinserts the tape cartridge 10 in a state where the tape cartridge 10 has been ejected by the tape cartridge transport mechanism 170 so that the front end 13 of the tape cartridge 10 protrudes outside of the mail slot 107.

Referring to FIGS. 14 and 15, the stopper mechanism 500 comprises a stopping member 501 and a spring member 520. The stopping member 501 comprises a long plate section 502 in the X1-X2 directions, flange portions 503 and 504 disposed at corresponding ends of the plate section 502 in the X1-X2 directions. The stopper mechanism 501, having a U-shaped form viewed from the Y2 side, further comprises stopping pawls 505 and 506 provided on the plate section 502. In addition, each of shaft portions 507, 508 and blade portions 509, 510 protrude from the upper end of the flange portions 503 and 504, respectively, so as to mutually face one another.

The stopping member 501, including shaft portions 507 and 508 supported by notches 341a and 341b of the frame 341, covers a part of the frame 341. A spring part 520 connects the flange portion 504 and the frame 341 to energize the stopping member 501 to be rotated in the A1 direction. Referring to FIGS. 13B and 14, the plate section 502 is positioned at a height substantially corresponding to the height of the Z2 side of the mail slot 107. The stopping pawls 505 and 506 positioned apart mutually in the X1-X2 direction protrude in the Z1 direction. The stopping pawls 505 and 506 are positioned a little higher than the lower part (the Z2 part) of the tape cartridge 10 to be inserted. The lateral sides of the Y1 side of the stopping pawls 505 and 506 are inclined planes 505a and 506a, respectively.

It should be noted that the frame 341 comprises correction member attaching sections 341c and 341d for mounting a correction part 530 described below.

5 [Operations of Stopper Mechanism 500]

Figure 16:
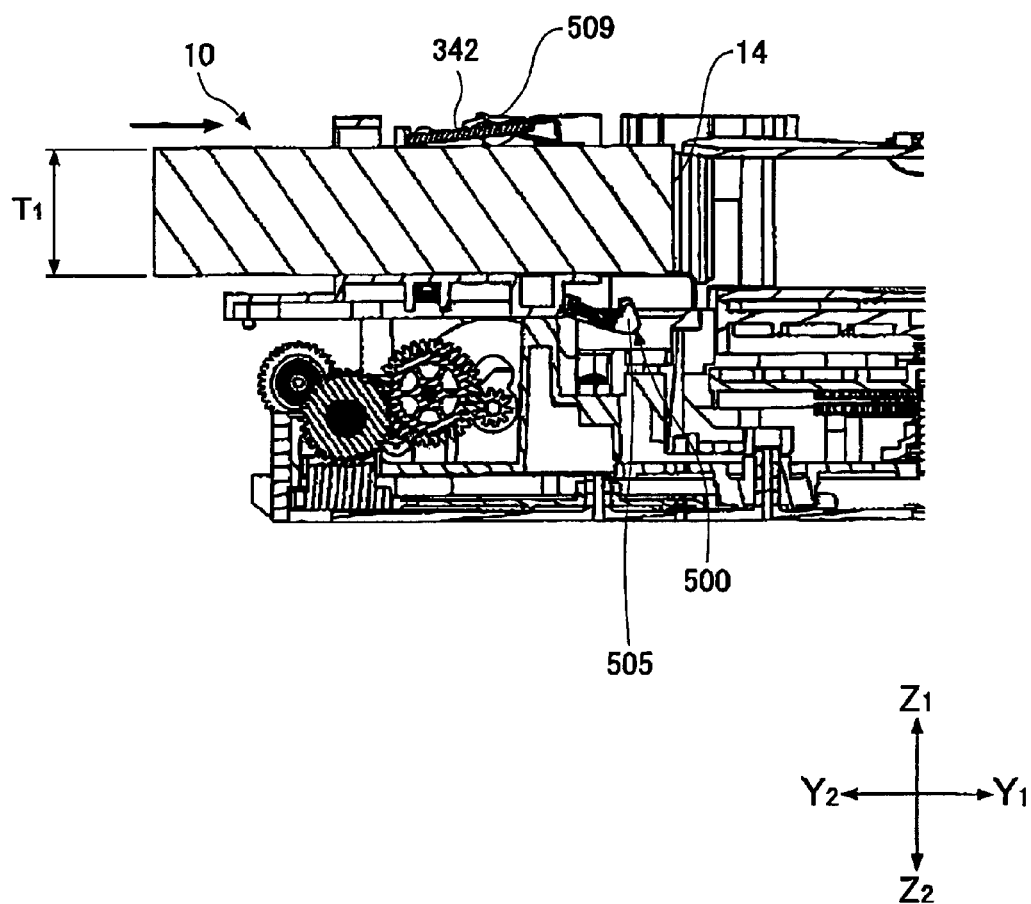
FIG. 16 is a view illustrating the state of a stopper mechanism when the media cartridge is being inserted.

FIG. 16 is a view illustrating the operations of the stopper mechanism 500 when the first tape cartridge 10 is inserted manually.

In one embodiment, when the operator inserts the first tape cartridge 10 via the mail slot 107 in the state where the door locking mechanism 345 is unlocked, the tape cartridge 10 pushes and opens the door 342. The door 342 pushes up blade portions 509 and 510. Then, the stopping member 501 can be rotated in the clockwise direction around the shaft portions 507 and 508. The stopping pawls 505 and 506 are lowered in the Z2 direction to reduce the likelihood of interfering with the tape cartridge 10 to be inserted. Accordingly, the tape cartridge 10 is normally inserted as shown in FIG. 16.

Figure 17:
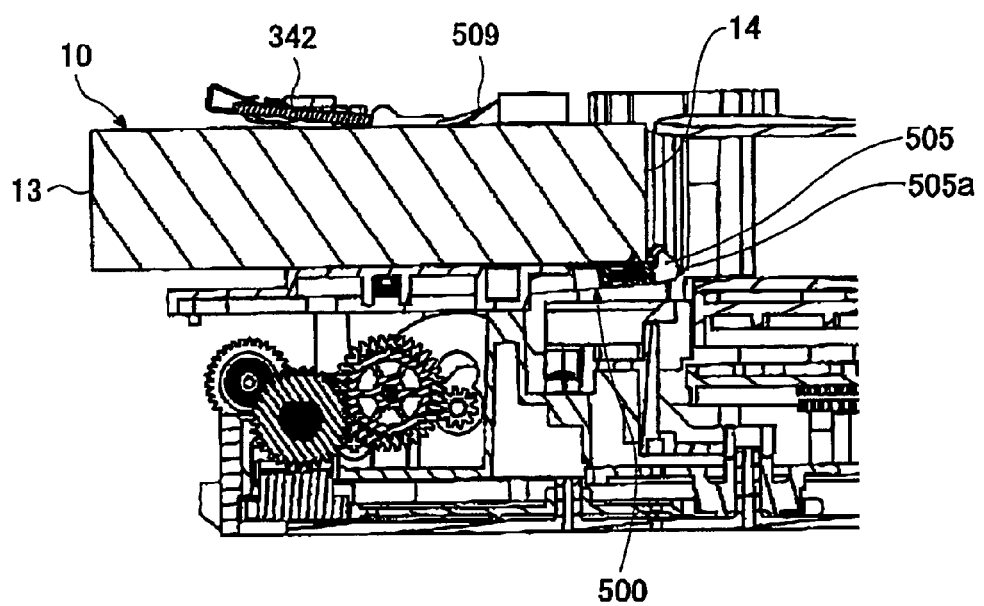
FIG. 17 is a view illustrating the state of the stopper mechanism when the media cartridge is finished being ejected by the media cartridge transport mechanism.

FIG. 17 illustrates operations of the stopper mechanism 500 when the first tape cartridge 10 is ejected by the tape cartridge transport mechanism 170 so that the front end 13 of the first tape cartridge 10 protrudes outside of the mail slot 107.

After the tape cartridge 10 is mounted in the tape cartridge autoloader 100, the door 342 closes and the stopper mechanism 500 is in the state as shown in FIG. 13B.

According to an eject instruction, the tape cartridge transport mechanism 170 operates, and thus, the tape cartridge 10 is moved in the Y2 direction from the turntable 140. The tape cartridge 10 contacts inclined planes 505a and 506a of the stopping pawls 505 and 506, and then, exerts a downward force in the Z2 direction on the stopping pawls 505 and 506. The tape cartridge 10 is ejected so that the front side 13 thereof protrudes outside of the mail slot 107 and the rear side 14 thereof passes over the stopping pawls 505 and 506.

Accordingly, in the state where the tape cartridge 10 is finished being ejected by the tape cartridge transport mechanism 170, in one embodiment, the stopper mechanism 500 is in the state as shown in FIG. 17. In other words, in this embodiment, the stopping member 501 is rotated by the spring member 520, and brought back in the original state as shown in FIG. 13B. The stopping pawls 505 and 506 oppose the lower part of the rear side 14 of the tape cartridge 10.

Therefore, in the state where the tape cartridge is finished being ejected as shown in FIG. 17, when the operator inadvertently attempts to reinsert the tape cartridge 10, the tape cartridge 10 is inhibited from full insertion by corners of the rear side 14 on the lower part (near the Z2 section) of the tape cartridge 10. Accordingly, further movement is regulated and the tape cartridge 10 is inhibited from being fully reinserted unnecessarily.

After the tape cartridge 10 has been ejected by the tape cartridge transport mechanism 170, the operator can grab the front side 13 of the tape cartridge 10 to remove the tape cartridge 10. After the operator grabs and pulls out the tape cartridge 10, the door 342 can then close and lock to inhibit the tape cartridge 10 from being reinserted unnecessarily.

6 [Configuration of Tape Cartridge Autoloader 100A in which Second Tape Cartridge is Used]

Figure 18:
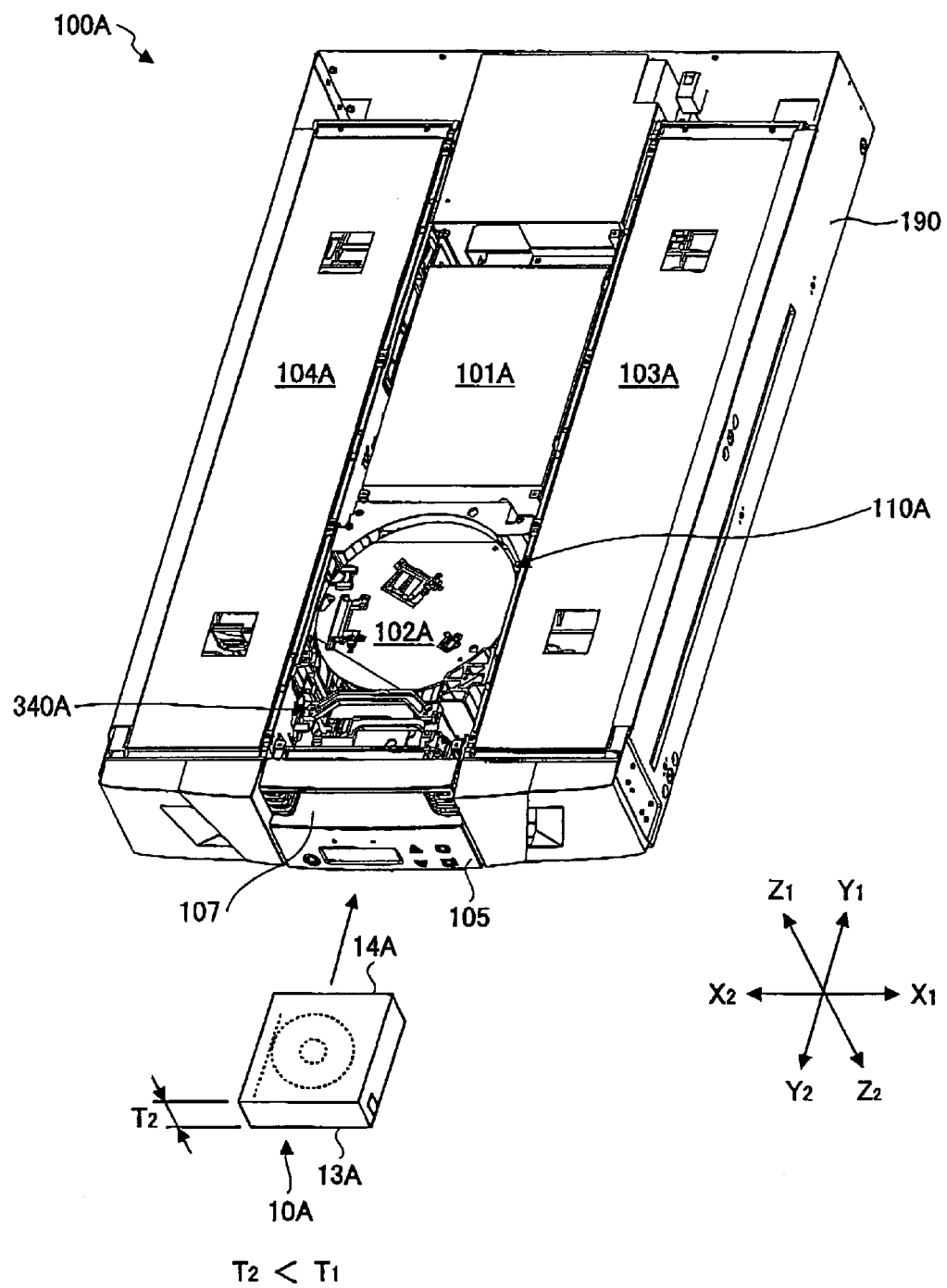
FIG. 18 is a perspective view illustrating a media cartridge autoloader for a second media cartridge with an upper cover thereof removed.

FIG. 18 is a view illustrating the tape cartridge autoloader 100A in which a second tape cartridge 10A is used.

In one embodiment, the second tape cartridge 10A can have substantially the same outside dimensions of the first tape cartridge 10. However, a thickness T2 of the tape cartridge 10A is less than the thickness T1 of the tape cartridge 10. In alternative embodiments, different relative configurations between the tape cartridges 10 and 10A can be used with the present invention.

In one embodiment, the tape cartridge autoloader 100A comprises a tape drive 101A corresponding to the second tape cartridge 10A, a tape cartridge picker 102A, tape cartridge transport magazines 103A and 104A, a main module 110A and a mail slot module 340A.

7 [Configuration and Operation of Mail Slot Module 340A]

Figure 19:
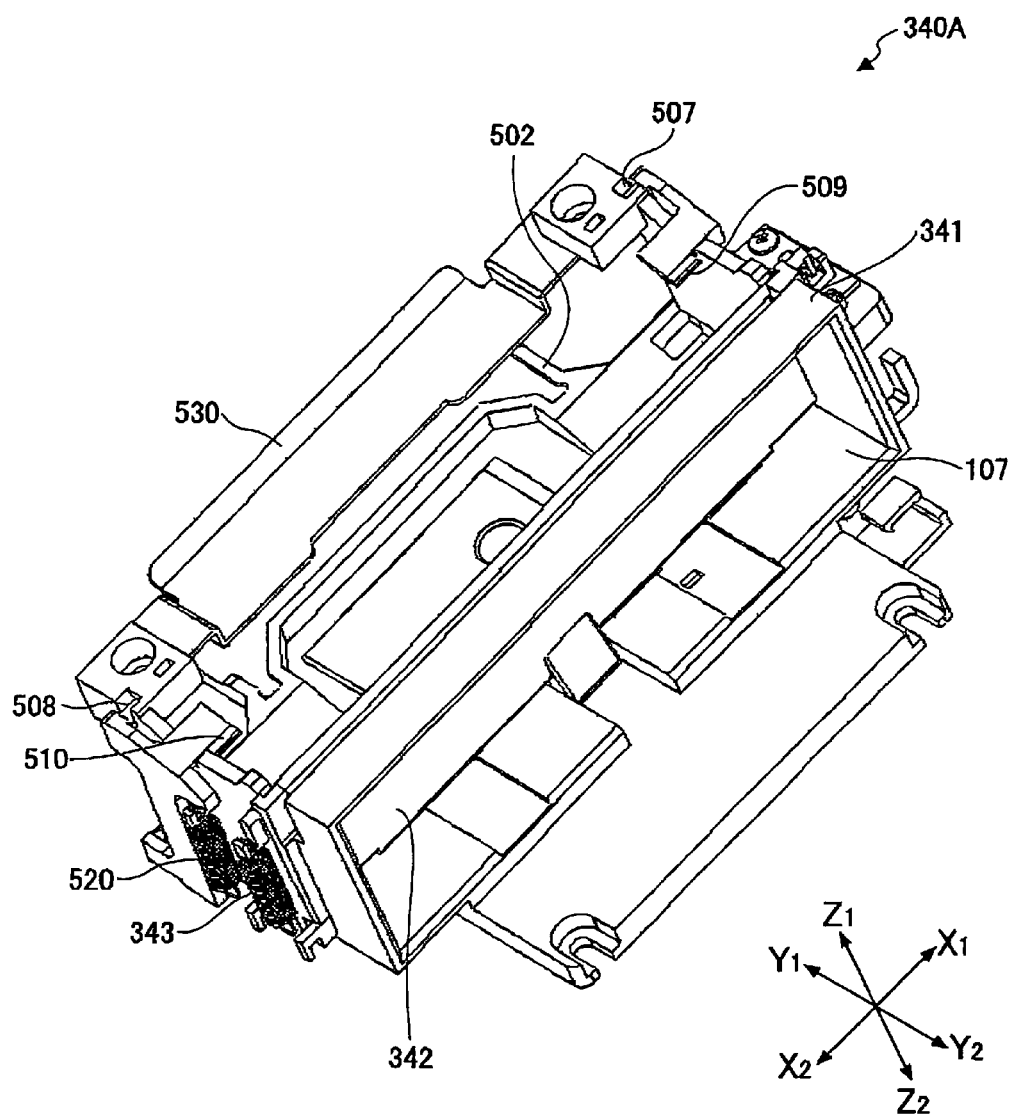
FIG. 19 is a perspective view illustrating the mail slot module as shown in FIG. 18.

The mail slot module 340A has a configuration as shown in FIG. 19 and differs from the configuration of the mail slot module 340 shown in FIG. 14 in mounting a correction member 530. The mail slot module 340A comprises the same stopper mechanism 500 as above described stopper.

Accordingly, in manufacturing the mail slot module 340A, the same production line by which the mail slot module 340 is manufactured can be used. Thus, manufacture of the mail slot module 340A and the autoloader 100, 100A is made easier and more efficient.

Figure 20:
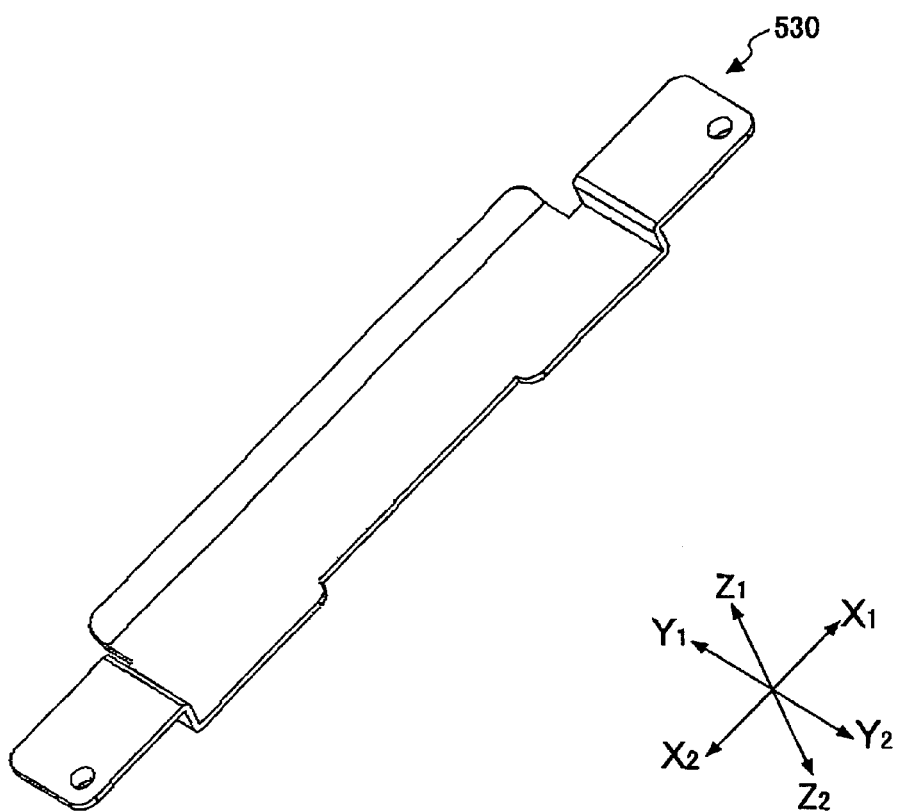
FIG. 20 is a view illustrating a correction member.

Referring to FIG. 20, the correction member 530 can be a sheet metal member, for example, lowering a ceiling part of the mail slot 107 by an amount T1-T2. As shown in the embodiment illustrated in FIG. 19, corresponding ends of the correction member 530 are mounted on the correction member attaching sections 341c and 341d (See FIG. 15). The correction member 530 extending a little in the Z2 direction is provided for connecting the correction part mounting parts 341c and 341d.

Figure 21:
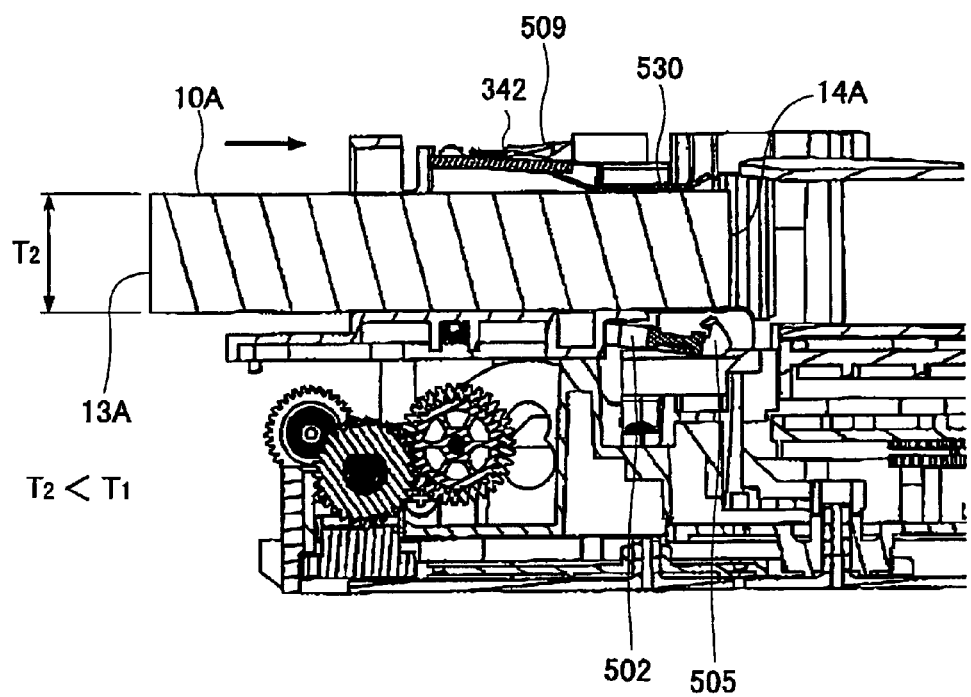
FIG. 21 is a view illustrating the state of the stopper mechanism when the second media cartridge is being inserted.

FIG. 21 is a view illustrating one embodiment of the operation of the stopper mechanism 500 when the tape cartridge 10A is manually inserted. The upper side of the second tape cartridge 10A is guided in the Z1-Z2 direction by the correction member 530 so that the cartridge 10A can be inserted without unnecessary play in the Z1-Z2 direction. The stopper mechanism 500 operates in the same way as when the first tape cartridge 10 is inserted. The tape cartridge 10A is inserted over the stopping pawls 505 and 506.

Figure 22:
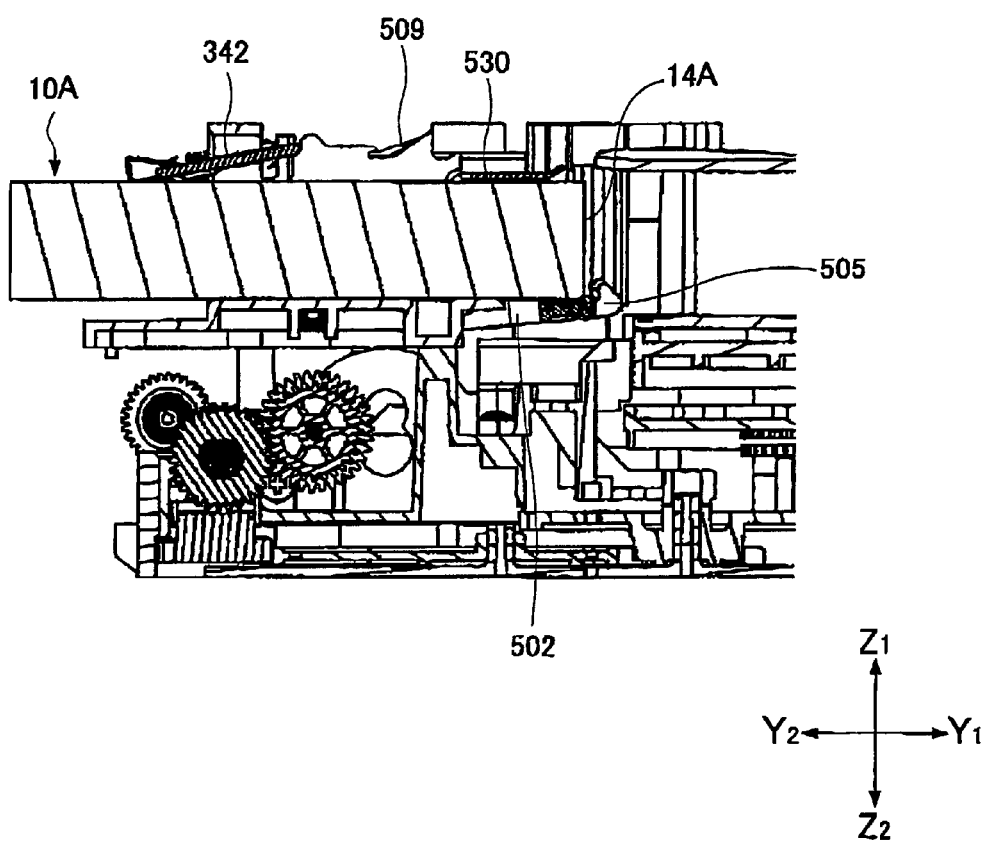
FIG. 22 is a view illustrating the state of the stopper mechanism when the second media cartridge is finished being ejected by the media cartridge transport mechanism.

FIG. 22 is a view illustrating the state where the tape cartridge 10A has been completely ejected by the tape cartridge transport mechanism 170. The stopping pawls 505 and 506 oppose the lower part of the rear side 14A of the tape cartridge 10A.

Accordingly, in the state where the tape cartridge has been completely ejected as shown in FIG. 22, even if the operator inadvertently attempts to reinsert the tape cartridge 10A, corners of the rear side 14A and the lower part of the tape cartridge 10A are stopped. Thus, further movement is regulated to inhibit or prevent the tape cartridge 10A from being reinserted unnecessarily. Stated another way, with the designs provided herein, the stopper mechanism 500 can selectively impede movement of the tape cartridge 10, 10A into the main module 110.

The present application is based on Japanese Priority Application No. 2005-269196 filed on Sep. 15, 2005, with the Japanese Patent Office, the entire contents of which are hereby incorporated by reference.

While the particular autoloader 100 as herein shown and disclosed in detail is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A media cartridge autoloader comprising:
   a main module including a media cartridge picker that pulls in a media cartridge from a rear end thereof via a mail slot and sends out the media cartridge from a front end thereof via the mail slot;
   a media drive, disposed at a rear portion of the main module, configured to selectively receive the media cartridge; and
   first and second media cartridge transport magazines respectively disposed at lateral ends of the main module and each configured to transportably store the media cartridge;
   wherein said main module further comprises a stopper mechanism configured to prevent the media cartridge which is selected to protrude outside of the mail slot from being inserted
   by engaging and stopping a lower part of a rear surface at the rear end of the media cartridge.

2. The media cartridge autoloader as claimed in claim 1, wherein
   said main module comprises a door which opens towards an inside of the media cartridge autoloader when pushed by the rear end of media cartridge and is opened towards an outside of the media cartridge autoloader when pushed by the front end of the media cartridge which is ejected by the media cartridge picker;
   said stopper mechanism comprises a stopping member including a stopping pawl and a blade portion, said stopping member being mounted on a frame of the main module;
   said stopping pawl is provided at a position where said stopping pawl stops the lower part of the rear surface at the rear end of the media cartridge;
   said blade portion is provided at a rear of the door;
   said door pushes the blade portion and operates the stopping member to move the stopping pawl to a position where the stopping pawl does not interfere with the insertion of the media cartridge when the door is opened towards the inside of the media cartridge autoloader; and
   said door does not push the blade portion and the stopping pawl remains at a position where the stopping pawl contacts the lower part of the rear surface at the rear end of the media cartridge and stops the media cartridge when the door is opened towards the outside of the media cartridge autoloader.

3. The media cartridge autoloader as claimed in claim 1, further comprising:
   a correction member, removably mounted on the main module, and configured to lower a ceiling part of the mail slot,
   wherein said correction member is mounted to adapt to a media cartridge having a first thickness, and said correction member is removed to adapt to a media cartridge having a second thickness larger than the first thickness.

4. The media cartridge autoloader as claimed in claim 1, wherein said stopper mechanism engages and stops a lower rear edge portion at the rear end of the media cartridge.

5. A media cartridge autoloader comprising:
   a main module having a mail slot;
   a media cartridge picker configured to receive a media cartridge via the mail slot and to elect the media cartridge via the mail slot, said media cartridge having a rear end from which the media cartridge is inserted into the media cartridge autoloader via the mail slot;
   a media drive disposed adjacent to the media cartridge picker and configured to selectively receive the media cartridge;
   a media cartridge transport magazine disposed adjacent to the cartridge picker and configured to movably store the media cartridge; and
   a stopper mechanism configured to inhibit reinsertion of the media cartridge which has been ejected to a position where the media cartridge protrudes at least partially through the mail slot towards an outside of the media cartridge autoloader, by engaging a lower part of a rear surface at the rear end of the media cartridge.

6. The media cartridge autoloader as claimed in claim 5, further comprising:
   a door configured to open towards an inside of the media cartridge autoloader when pushed by the rear end of the media cartridge being inserted and to open towards the outside of the media cartridge autoloader by a front end of the media cartridge being ejected by the media cartridge picker.

7. The media cartridge autoloader as claimed in claim 6, wherein the stopper mechanism includes a stopping pawl configured to move and contact the rear end of the media cartridge which has been ejected to the position where the media cartridge protrudes at least partially through the mail slot towards the outside of the media cartridge autoloader.

8. The media cartridge autoloader as claimed in claim 7, wherein:
   when the door is opened towards the inside of the media cartridge autoloader, the door causes the stopping pawl to move to a position which does not impede insertion of the media cartridge, and
   when the door is opened towards the outside of the media cartridge autoloader, the door does not cause movement of the stopping pawl, so that the stopping pawl remains at the position making contact with the media cartridge to impede movement of the media cartridge towards the inside of the media cartridge autoloader through the mail slot.

9. The media cartridge autoloader as claimed in claim 5, wherein said stopper mechanism engages and stops a lower rear edge portion at the rear end of the media cartridge.

10. A method for inhibiting reinsertion of a partially ejected media cartridge into a media cartridge autoloader that includes a mail slot, a media drive and a media cartridge transport magazine, said method comprising the steps of:
    controlling a stopper mechanism to an active position when a front end of the media cartridge is at least partially ejected through the mail slot to a predetermined position by an eject operation; and
    inhibiting the media cartridge located at the predetermined position immediately after the eject operation from being fully reinserted through the mail slot by an insert operation, by the stopper mechanism which contacts and stops a lower rear edge portion at a rear end of the media cartridge, opposite to the front end of the media cartridge, at said active position.

11. A media cartridge autoloader comprising:
    a main module including a media cartridge picker that pulls in a media cartridge from a rear side thereof via a mail slot and sends out the media cartridge from a front side thereof via the mail slot;
    a media drive disposed at a rear side of the main module, the media drive selectively receiving the media cartridge; and left and right media cartridge transport magazines disposed one at each lateral side of the main module and each configured to transportably store the media cartridge;

wherein:

said main module further comprises a stopper mechanism preventing the media cartridge from being inserted when inserting the media cartridge is attempted in a state where the media cartridge has been ejected so as to protrude outside of the mail slot;

said stopper mechanism is configured to come in contact with a lower part of the rear side of the media cartridge to stop the media cartridge in a state where the front side of the media cartridge is ejected of the mail slot;

said main module comprises a door which is opened to inside of the media cartridge autoloader by being pushed by the media cartridge inserted manually and is opened to outside of the media cartridge autoloader by being pushed by the media cartridge ejected by the media cartridge picker;

said stopper mechanism comprises a stopping member including a stopping pawl and a blade portion, said stopping member being mounted on a frame of the main module;

said stopping pawl is provided at a position where said stopping pawl stops the lower part of the rear side of the media cartridge;

said blade portion is provided at a rear side of the door;

when the door is opened to the inside of the media cartridge autoloader, said door pushes the blade portion so as to operate the stopping member to move the stopping pawl at a position where the stopping pawl does not interfere with the insertion of the media cartridge; and when the door is opened to the outside of the media cartridge autoloader, said door does not push the blade portion and the stopping pawl stays at a position where the stopping pawl comes in contact with the lower part of the rear side of the media cartridge to stop the media cartridge.

12. A media cartridge autoloader comprising:

a media cartridge picker that engages a media cartridge via a mail slot and ejects the media cartridge via the mail slot;

a media drive positioned near the media cartridge picker, the media drive selectively receiving the media cartridge;

a media cartridge transport magazine positioned near the cartridge picker and configured to movably store the media cartridge;

a stopper mechanism that inhibits the media cartridge from being fully inserted through the mail slot following ejection of the media cartridge while the media cartridge protrudes at least partially through the mail slot; and a door which opens toward the inside of the media cartridge autoloader by being pushed by the media cartridge being inserted and opens toward the outside of the media cartridge autoloader by being pushed by the media cartridge ejected by the media cartridge picker, wherein the media cartridge includes a front side that first emerges from the mail slot during ejection of the media cartridge, and an opposing rear side, and wherein the stopper mechanism includes a stopping pawl that contacts the rear side of the media during insertion to impede movement of the media cartridge through the mail slot.

13. The media cartridge autoloader as claimed in claim 12, wherein when the door is opened to the inside of the media cartridge autoloader, the door causes movement of the stopping pawl so that the stopping pawl does not impede insertion of the media cartridge, and when the door is opened to the outside of the media cartridge autoloader, the door does not cause movement of the stopping pawl, so that the stopping pawl remains in a position to contact the media cartridge to impede movement of the media cartridge through the mail slot.

* * * * *